United States Patent
Sui et al.

(10) Patent No.: US 9,988,849 B2
(45) Date of Patent: Jun. 5, 2018

(54) JOINTS COMPRISING CARBON NANOFORESTS

(71) Applicant: Halliburton Energy Services, Inc., Houston, TX (US)

(72) Inventors: Ping Sui, The Woodlands, TX (US); David Duckworth, Conroe, TX (US); Gary Weaver, Conroe, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 863 days.

(21) Appl. No.: 14/371,221

(22) PCT Filed: Jul. 18, 2013

(86) PCT No.: PCT/US2013/050975
§ 371 (c)(1),
(2) Date: Jul. 9, 2014

(87) PCT Pub. No.: WO2015/009298
PCT Pub. Date: Jan. 22, 2015

(65) Prior Publication Data
US 2015/0204444 A1    Jul. 23, 2015

(51) Int. Cl.
*E21B 10/25*     (2006.01)
*C01B 31/02*     (2006.01)
*F16J 15/00*     (2006.01)

(52) U.S. Cl.
CPC ......... *E21B 10/25* (2013.01); *C01B 31/0293* (2013.01); *F16J 15/00* (2013.01)

(58) Field of Classification Search
CPC ...... E21B 10/29; E21B 10/25; C01B 31/0293
See application file for complete search history.

(56) References Cited

U.S. PATENT DOCUMENTS

| 7,662,706 B2 | 2/2010 | Samuelson et al. |
| 7,875,536 B2 | 1/2011 | Samuelson et al. |
| 7,968,184 B2 | 6/2011 | Humphreys et al. |

(Continued)

FOREIGN PATENT DOCUMENTS

| EP | 20080172597 | 5/2009 |
| EP | 20110745232 | 12/2012 |

(Continued)

OTHER PUBLICATIONS

International Search Report and Written Opinion for PCT/US2013/050975 dated May 27, 2014.

*Primary Examiner* — D. Andrews
*Assistant Examiner* — Kristyn A Hall
(74) *Attorney, Agent, or Firm* — McDermott Will & Emery LLP

(57) ABSTRACT

Wellbore tools may use carbon nanoforests to reduce the access of abrasive particles to compressible sealing elements of joints of the wellbore tool. In some instances, a wellbore tool may include a joint comprising two elements having opposing mating surfaces that define a gap; a compressible sealing element arranged between the opposing mating surfaces and configured to seal a portion of the gap, thereby defining a sealed segment and an unsealed segment of the gap; and at least one carbon nanoforest disposed within at least a portion of the unsealed segment and coupled to at least one of the opposing mating surfaces.

23 Claims, 8 Drawing Sheets

(56) References Cited

U.S. PATENT DOCUMENTS

| | | |
|---|---|---|
| 2002/0027326 A1 | 3/2002 | Panigrahi et al. |
| 2008/0099244 A1 | 5/2008 | Chellappa et al. |
| 2008/0175786 A1 | 7/2008 | Zhang et al. |
| 2008/0213162 A1* | 9/2008 | Smalley ............... B01J 23/881 423/447.7 |
| 2009/0038858 A1 | 2/2009 | Griffo et al. |
| 2009/0142594 A1 | 6/2009 | Humphreys et al. |
| 2011/0303465 A1 | 12/2011 | Rupp et al. |
| 2012/0021954 A1 | 1/2012 | Gazit et al. |
| 2012/0202047 A1 | 8/2012 | Welch et al. |
| 2013/0058859 A1 | 3/2013 | Steiner, III et al. |

FOREIGN PATENT DOCUMENTS

| | | |
|---|---|---|
| WO | 2011103304 | 2/2011 |
| WO | 2011086382 A1 | 7/2011 |
| WO | 2015009298 A1 | 1/2015 |

* cited by examiner

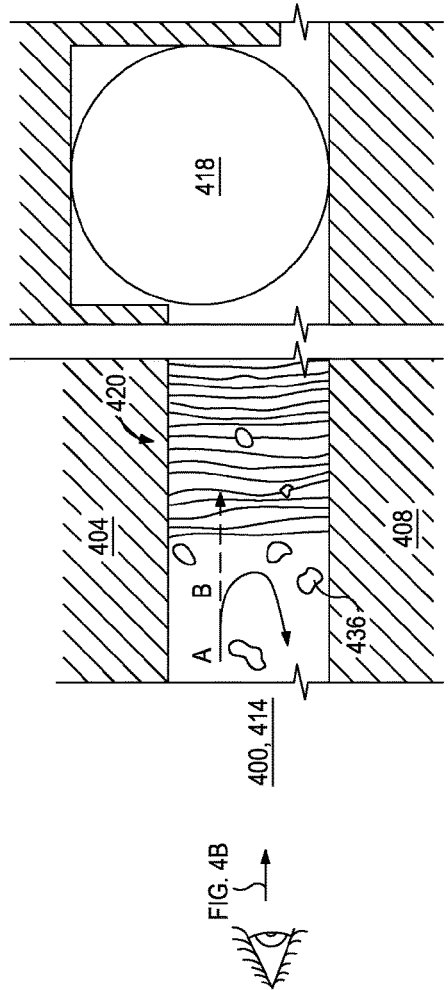
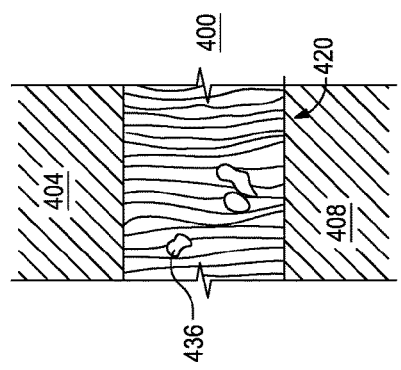
FIG. 4A
FIG. 4B

JOINTS COMPRISING CARBON NANOFORESTS

BACKGROUND

The innovative embodiments described herein relate to joints that use carbon nanoforests to reduce the access of abrasive particles to compressible sealing elements.

Compressible sealing elements (e.g., O-rings) are used for sealing joints (e.g., rotary joints, static joints, and the like) in a variety of wellbore tools. The compressible sealing elements are, in some instances, used to protect other portions of the wellbore tool like bearings. During operation, the compressible sealing elements are often contacted with wellbore fluids that include abrasive particles. These abrasive particles can wear the compressible sealing elements. As the compressible sealing elements wear, leaks may develop across the compressible sealing elements, thereby allowing the abrasive particles to contact and damage the portions of the wellbore tool that the compressible sealing element is intended to protect. This can lead to undesirable tool damage and possibly cessation of operations.

BRIEF DESCRIPTION OF THE DRAWINGS

The following figures are included to illustrate certain aspects of the present invention, and should not be viewed as exclusive embodiments. The subject matter disclosed is capable of considerable modifications, alterations, combinations, and equivalents in form and function, as will occur to those skilled in the art and having the benefit of this disclosure.

FIG. 4A provides a cross-sectional view of a gap of a joint illustrating filtration via carbon nanoforests described herein.

FIG. 4B provides an end view down a gap of a joint illustrating filtration via carbon nanoforests described herein.

DETAILED DESCRIPTION

The innovative embodiments described herein relate to joints that use carbon nanoforests to reduce the access of abrasive particles to compressible sealing elements.

As used herein, the term "carbon nanoforest" refers to a plurality of carbon nanostructures vertically aligned, that is, the long axis of the nanostructure extends substantially perpendicular from the substrate coupled thereto. A carbon nanoforest may include single-walled carbon nanotubes ("SWNTs"), multi-walled carbon nanotubes ("MWNTs") (e.g., 2 to 50 or more walls), carbon nanohorns, graphene, graphene nanoribbons, other elongated carbon nanostructures, or a combination thereof. It should be noted that graphene encompasses few-layer graphene.

In one aspect, the present disclosure identifies and addresses problems with abrasive particles in drilling fluids potentially damaging compressible sealing elements, such as seals in a drill bits, as well as in other wellbore tools like sliding sleeves, reamers, pumps, and the like. As identified herein, the abrasive particles in drilling fluids (e.g., formation cuttings as well as additives like weighting agents) typically move very turbulently and at very high velocities. The disclosed systems and methods include various particular uses of carbon nanoforests to help trap or otherwise mitigate such abrasive particles from accessing the compressible sealing elements to prevent abrasive wear. As a result, such problems associated with the abrasive materials should be minimized, which should prolong the lifetime of the wellbore tool. For example, prolong the lifetime of a drill bit may reduce the number of times the drill bit is retrieved from a downhole environment, which can take hours, in a drilling operation, thereby minimizing nonproductive time and costs.

Figure 1:
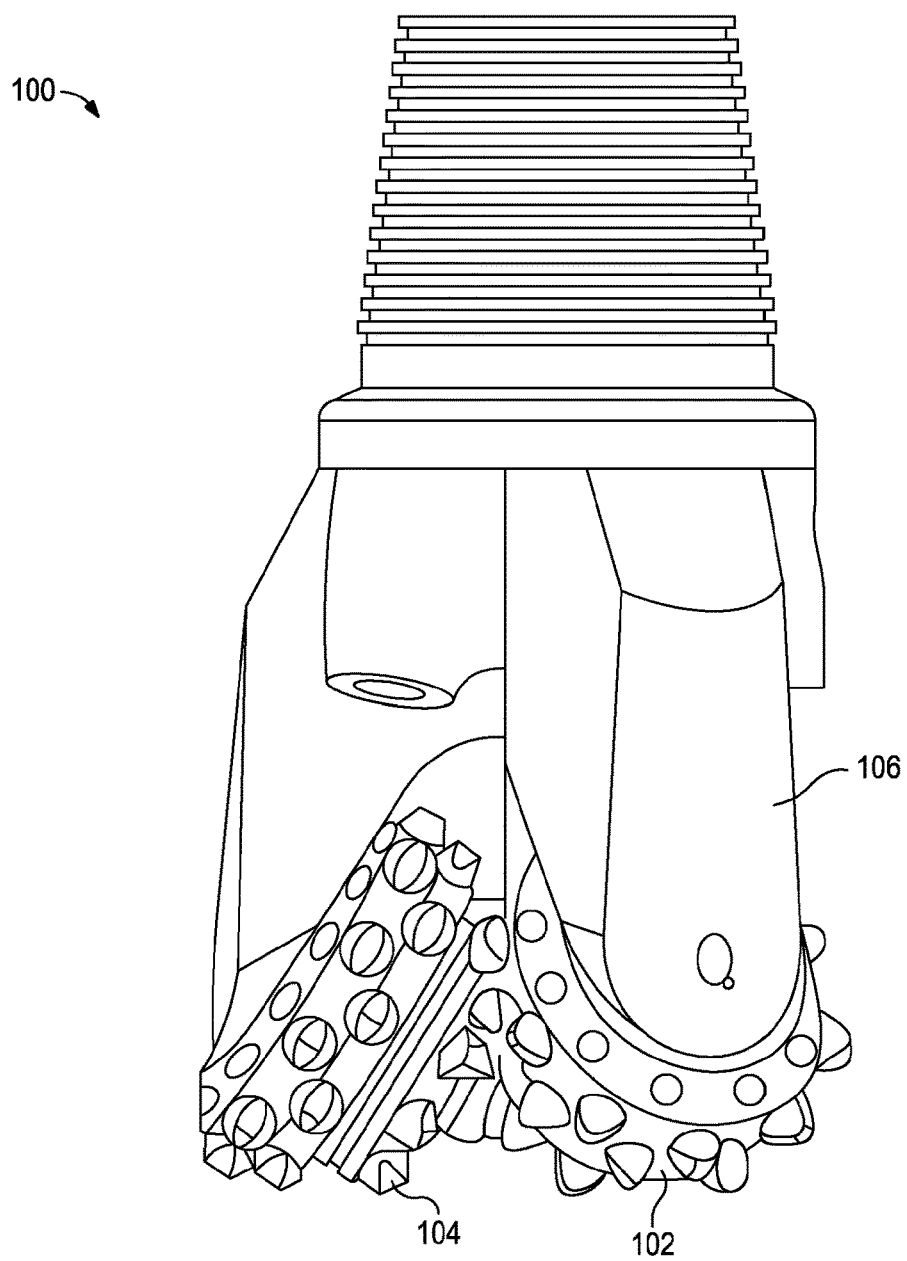
FIG. 1 provides a diagram of a roller cone bit.
Figure 2:
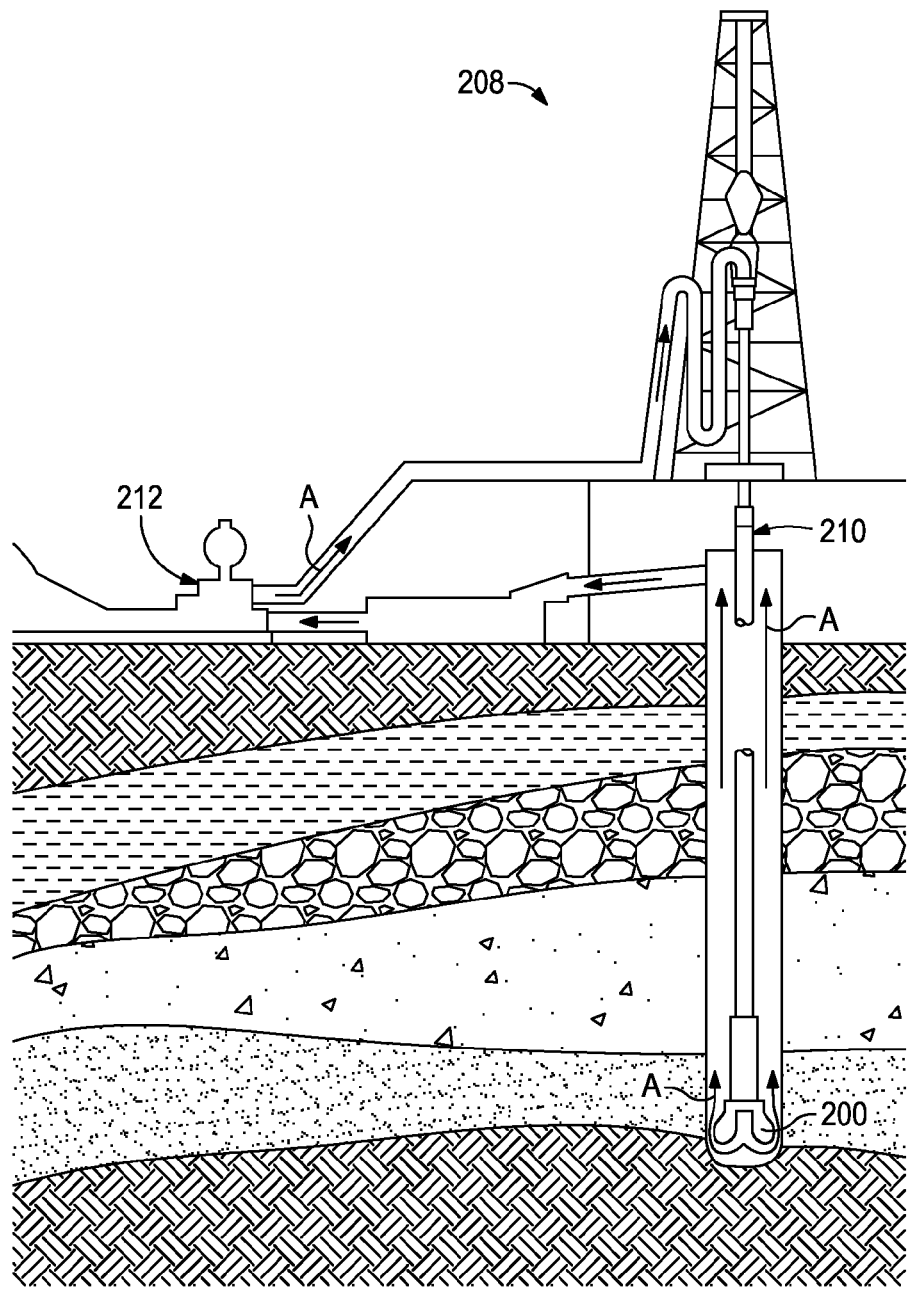
FIG. 2 provides a diagram of a drilling rig for drilling a wellbore into a subterranean formation.

One common type of drill bit used in wellbore drilling is a roller cone drill bit, an example of which is illustrated in FIG. 1 as 100. In such bits, rotating cones 102 have teeth 104 (e.g., carbide insert or milled type teeth) on their outer surface and are each mounted on an arm 106 of the drill bit body. During drilling, as illustrated in FIG. 2, a drill rig 208 uses sections of pipe 210 to transfer rotational force to the drill bit 200 and a pump 212 to circulate drilling fluid (as illustrated as flow arrows A) to the bottom of the wellbore through the sections of pipe 210. As the drill bit rotates, the applied weight-on-bit ("WOB") forces the downward pointing teeth of the rotating cones into the formation being drilled. Thus, the points of the teeth apply a compressible stress which exceeds the yield stress of the formation, and this induces fracturing in the formation. The resulting fragments (also referred to as "cuttings") are flushed away from the cutting face by a high flow of the drilling fluid (also referred to as "mud").

Figure 3:
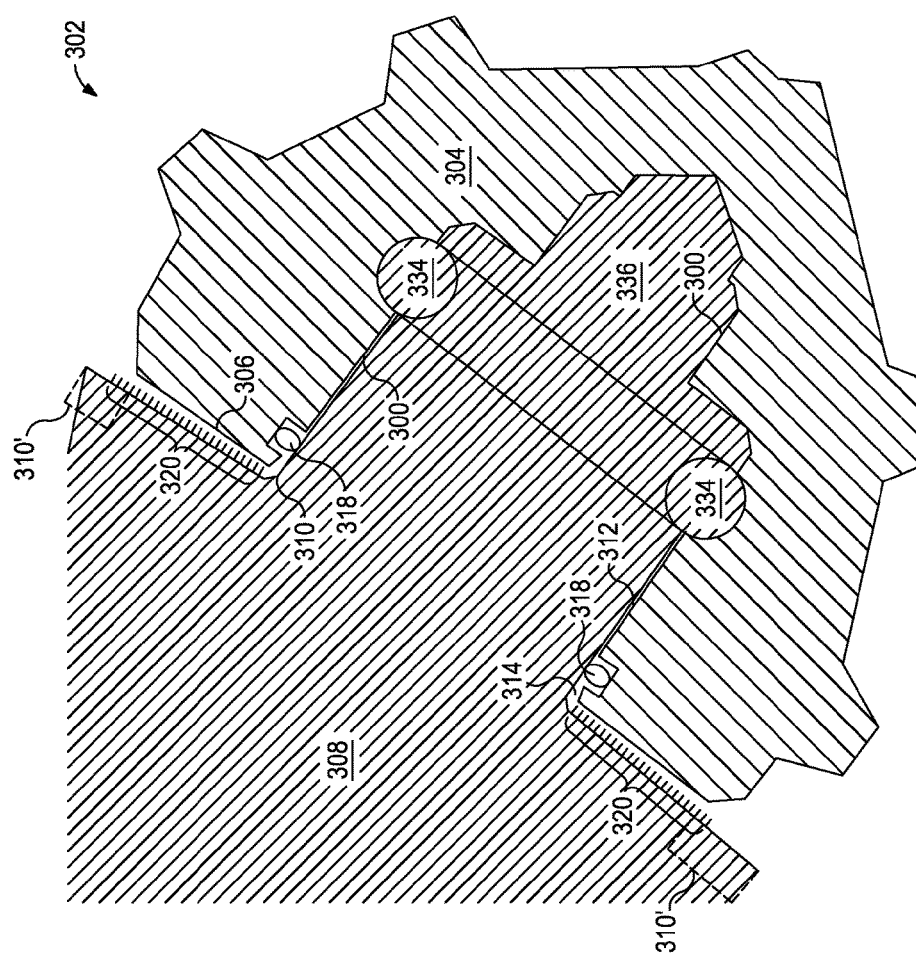
FIG. 3 provides a cross-sectional diagram of a portion of a roller cone bit according to at least one embodiment described herein with a carbon nanoforest in the unsealed segment of the gap of a joint.

FIG. 3 illustrates a cross-sectional diagram of a portion of a roller cone bit having seals that can be protected according to aspects of the present disclosure. More particularly, FIG. 3 illustrates an exemplary joint 302 of a roller cone bit. Joint 302 comprises first and second elements, which in this embodiment, by way of example, are roller cone 304 and a support arm 308 respectively. The roller cone 304 is supported on bearings 334 and a spindle 336. Each of these two elements—the roller cone 304 and the support arm 308—have opposing mating surfaces: a first mating surface 306 of the roller cone 304 and second mating surface 310 of the support arm 308 that jointly define a gap 300. The distance between the mating surfaces 306 and 310 may vary along the gap 300. The compressible sealing element 318 is configured to seal a portion of the gap 300, thereby defining a sealed segment 312 and an unsealed segment 314. Typically, the distance between the mating surfaces 306 and 310 is smaller along the sealed segment 312 of the gap 300 than along the unsealed segment 314 of the gap 300, which provides the necessary space to include a carbon nanoforest as described herein. In other embodiments, however, the distance between the mating surfaces 306 and 310 may be larger along the sealed segment 312 of the gap 300 than along the unsealed segment 314 of the gap 300, or the distance may be substantially equal, without departing from the scope of the disclosure.

In some embodiments, at least one carbon nanoforest is within at least a portion of the unsealed segment 314 of the gap 300 and coupled to one of the mating surfaces 306 or 310. In some instances, the carbon nanoforest may extend beyond the gap 300 and be coupled to an extended surface corresponding to the mating surface to which the carbon nanoforest is coupled. Referring again to FIG. 3, carbon nanoforest 320 is coupled to a portion of second mating surface 310 including a portion of extended surface 310'.

Carbon nanoforests may be coupled to mating surfaces by a plurality of methods, including, directly growing the carbon nanoforest on the mating surface (referred to herein as "directly coupled" or grammatical equivalents thereof) or adhering the carbon nanoforest or a corresponding substrate to the mating surface (referred to herein as "adhesively coupled" or grammatical equivalents thereof). It should be noted that unless otherwise specified, embodiments that describe coupling the carbon nanoforest to a mating surface encompass both direct coupling and adhesive coupling. The methods for achieving each are discussed further herein.

In some of the disclosed embodiments, the carbon nanoforests are illustrated, by way of example, as extending from one mating surface toward the other mating surface but not touching the other mating surface or another carbon nanoforest coupled thereto. Alternatively, in other embodiments within the scope of the present teachings, the carbon nanoforests may extend from a mating surface to a desired degree or distance (e.g., so as not to or minimally touch the other mating surface or another carbon nanoforest coupled thereto, so as to touch the other mating surface or another carbon nanoforest coupled thereto, or so as to be compressed by the other mating surface or another carbon nanoforest coupled thereto). For example, in some embodiments, the carbon nanoforest may be under compression in the gap of a joint.

FIGS. 4A and 4B illustrate an enlarged views of an exemplary gap 400 between the first element 404 and the second element 408 having a carbon nanoforest 420 arranged therein, according to one or more embodiments. In exemplary operation, carbon nanoforest 420 may act as a filter to reduce the access of abrasive particles 436 to the compressible sealing element 418 (FIG. 4A), thereby extending the lifetime of the sealing element 418 and the wellbore tool. FIG. 4A illustrates a cross-sectional view of a portion gap 400 that illustrates the drilling fluid comprising abrasive particles 436 flowing in unsealed segment 414 so as to contact carbon nanoforest 420. Fluids circulating or otherwise flowing through the unsealed segment 414 may encounter the carbon nanoforest 410 and some will return to the wellbore (arrow A), while some may traverse (arrow B) carbon nanoforest 420 to reach the compressible sealing element 418. Carbon nanoforest 420 may be configured to obstruct the majority of abrasive particles 436 allowing the particles to recirculate out of gap 400 with the fluid (arrow A) and substantially filter the other abrasive particles 436 that are carried with the fluid that traverses carbon nanoforest 420 (arrow B). FIG. 4B illustrates an end view down a portion of carbon nanoforest 420 within gap 400 and illustrates a plurality of abrasive particles 436 as trapped within carbon nanoforest 420.

Further, without theoretical limitation, it is believed that as the carbon nanoforest wears, the byproduct will include nanotube segments, graphene, or few layer graphene, which have been shown to be effective lubricants. As such, the byproducts of carbon nanoforest wear may minimally impact the lifetime of the compressible sealing element. Moreover, the carbon nanoforest may prove useful in providing protection to the mating surface coupled thereto from impingement of abrasive particles, which may further extend the lifetime of the wellbore tool.

Figure 5:
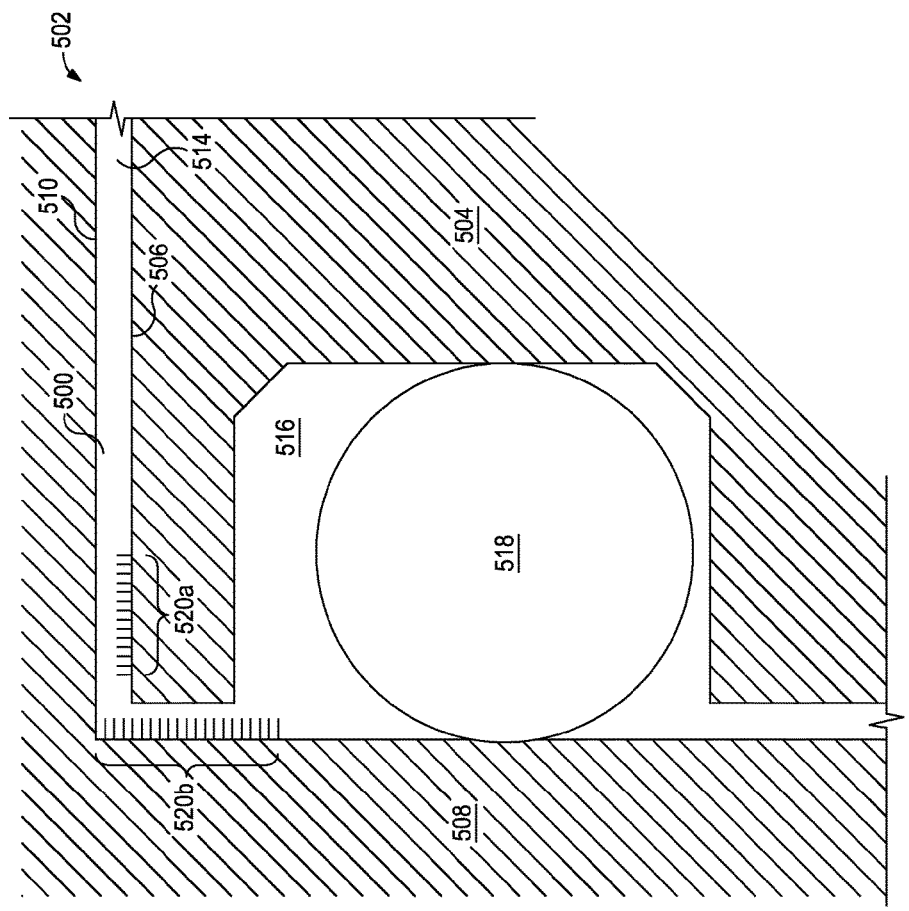
FIG. 5 provides a cross-sectional diagram of a gap of a joint with carbon nanoforests in the unsealed segment.

FIG. 5 illustrate a cross-sectional view of a portion of joint 502, according to at least one embodiment described herein. As illustrated, two carbon nanoforests 520a,520b are arranged in series within unsealed segment 514 of gap 500, wherein carbon nanoforest 520a is coupled to first mating surface 506 of first element 504 and carbon nanoforest 520b is coupled to second mating surface 510 of second element 508 and is proximal to compressible sealing element 518 relative to carbon nanoforest 520a. Further, carbon nanoforest 520b may extend into a groove 516 defined in the first element 504 and configured to receive and seat the compressible sealing element 518. In other embodiments, however, the groove 516 may be defined in the second element 508 or in both elements 504 and 508 and configured to receive and seat the compressible sealing element 518, without departing from the scope of the disclosure.

Figure 6:
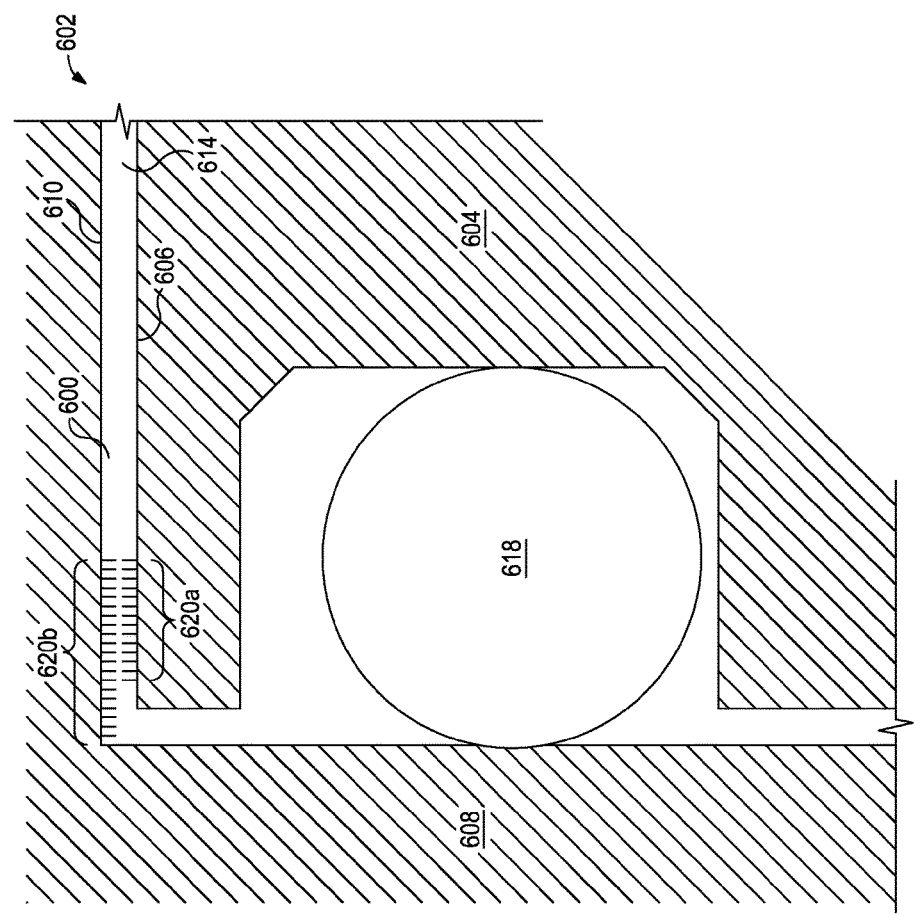
FIG. 6 provides a cross-sectional diagram of a gap of a joint with carbon nanoforests in the unsealed segment.

FIG. 6 illustrates a cross-sectional view of joint 602, according to at least one embodiment described herein. As illustrated, two carbon nanoforests 620a,620b are arranged in at least partial physical contact within unsealed segment 614 of gap 600 between first element 604 and second element 608, wherein carbon nanoforest 620a is coupled to first mating surface 606 of first element 604 and carbon nanoforest 620b is coupled to second mating surface 610 of second element 608. In some embodiments, carbon nanoforests 620a and 620b are coupled to corresponding portions of their mating surfaces 606 and 610, respectively, and extend radially therefrom toward each other. In at least one embodiment, portions of the distal ends of the carbon nanoforests 620a,620b may be in physical contact.

One of ordinary skill in the art with the benefit of this disclosure should recognize the plurality of configurations to which one or more carbon nanoforests may be arranged within portion(s) of the unsealed segment of the gap of a joint including being coupled to either of the mating surfaces. Additionally, one of ordinary skill in the art with the benefit of this disclosure should recognize that joints may be configured such that the distance between the mating surfaces along a portion of a sealed segment of the gap may be sufficient to allow for a carbon nanoforest to be included in the sealed segment of the gap. For example, a gland or groove may be included where a carbon nanoforest may be included (e.g., between the compressible sealing element and the bearings to mitigate particles produced from abrasive wear of the bearing from causing abrasive wear to the compressible sealing element).

One of ordinary skill in the art with the benefit of this disclosure should further recognize the configurational variations to the first and second elements to yield a joint applicable for other roller cone bit configurations and other wellbore tools like sliding sleeves, reamers, pumps, and the like.

Figure 7:
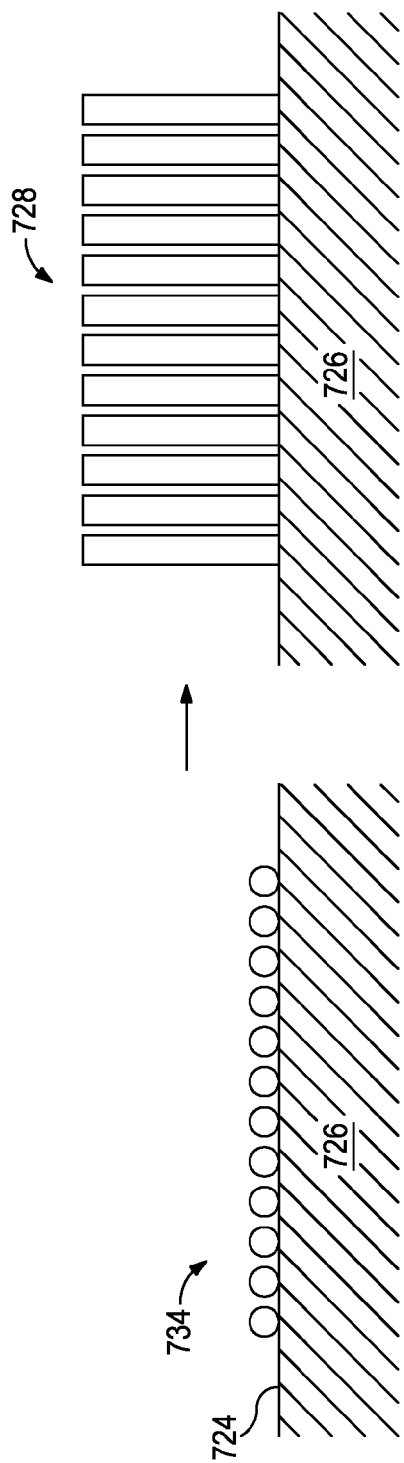
FIG. 7 illustrates growing a carbon nanoforest on a mating surface of a joint described herein so as to achieve direct coupling.

Relative to direct coupling of carbon nanoforests to mating surfaces described herein and illustrated in FIG. 7, some embodiments may involve providing a plurality of densely packed nanoparticle catalysts 734 on a mating surface 724 of an element 726 of a joint; and exposing the nanoparticle catalysts 734 to carbon nanostructure growth conditions for a time period so as to achieve a carbon nanoforest 728 with a desired height.

Figure 8:
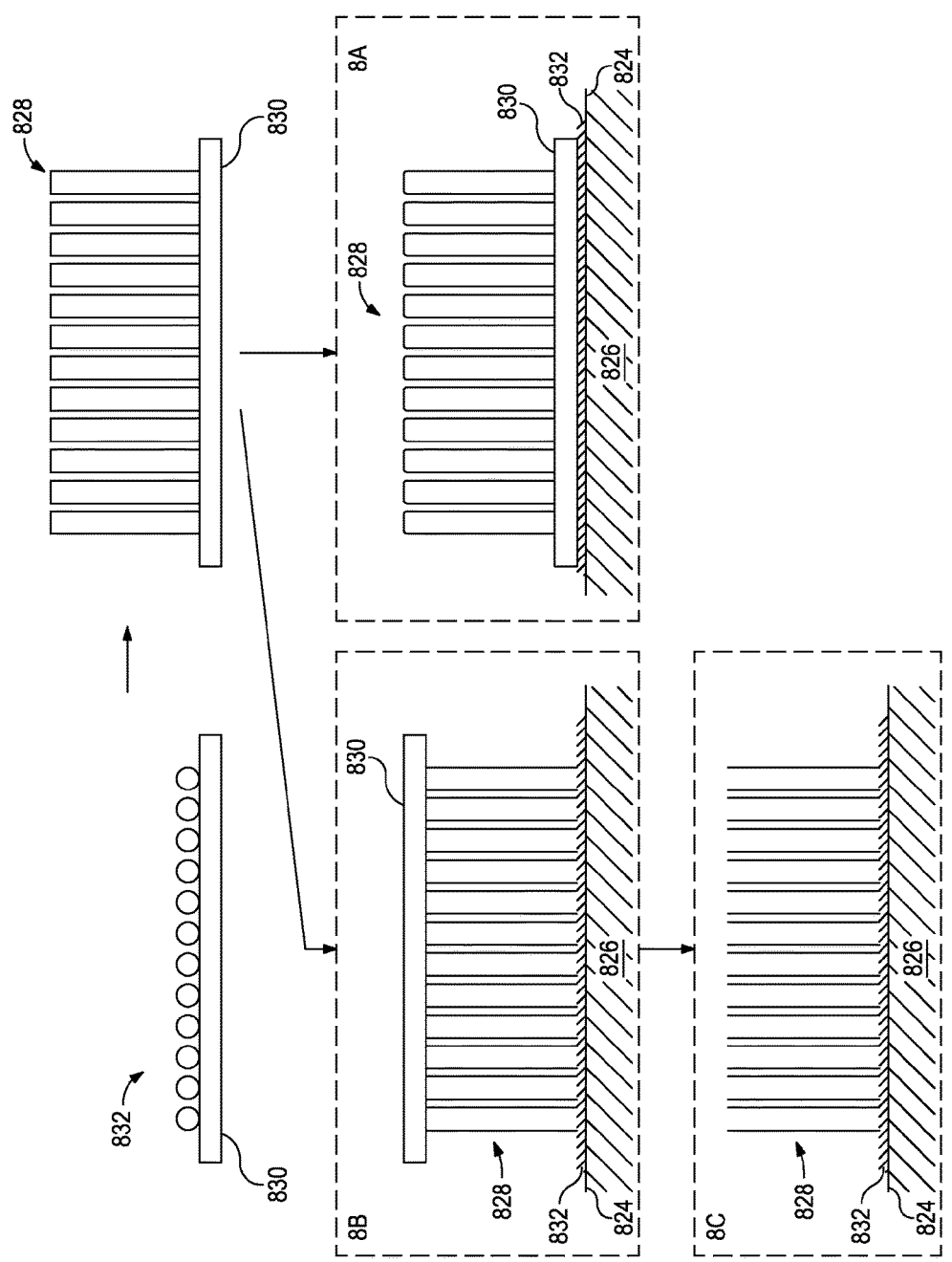
FIG. 8 illustrates growing a carbon nanoforest on a substrate and adhesive coupling of the carbon nanoforests to a mating surface of a joint described herein.

Relative to adhesive coupling of carbon nanoforests to mating surfaces described herein and illustrated in FIG. 8, some embodiments may involve providing a plurality of densely packed nanoparticle catalysts 834 on a substrate

830; exposing the nanoparticle catalysts 834 to carbon nanostructure growth conditions for a time period so as to achieve a carbon nanoforest 828 with a desired height; and adhering the substrate 830 to a portion of a mating surface 824 of an element 826 of a joint with an adhesive 832 (e.g., illustrated in 8A).

Relative to adhesive coupling of carbon nanoforests to mating surfaces described herein and illustrated in FIG. 8, some embodiments may involve providing a plurality of densely packed nanoparticle catalysts 834 on a substrate 830; exposing the nanoparticle catalysts 834 to carbon nanostructure growth conditions for a time period so as to achieve a carbon nanoforest 828 with a desired height; adhering the carbon nanoforest 828 to a portion of a mating surface 824 of an element 826 of a joint with an adhesive 832 (e.g., illustrated in 8B); and separating the carbon nanoforest from the substrate 830 (e.g., illustrated in 8C).

Some embodiments may further involve assembling the joint using an element described herein having a carbon nanoforest coupled thereto. In some instances, the joint may be a portion of a roller cone bit, a sliding sleeve, a reamer, a pump, or other wellbore tool with a joint having a compressible sealing element that, during operation, is exposed to a fluid that includes abrasive materials.

Some embodiments may further involve implementing in a wellbore operation the wellbore tool that comprises a carbon nanoforest within at least a portion of an unsealed segment of a gap of a joint. For example, some embodiments may further involve drilling a portion of a wellbore with a roller cone bit that comprises a carbon nanoforest within at least a portion of an unsealed segment of a gap of a joint. In another example, some embodiments may further involve drilling a portion of a wellbore (or drilling and expanding a portion of a pilot hole for a wellbore) with a reamer that comprises a carbon nanoforest within at least a portion of an unsealed segment of a gap of a joint.

Adhesives suitable for use in adhering a substrate or carbon nanoforest to a mating surface should be capable of maintaining adherence in the temperature, pressure, and chemical environment in which the joint is operated. Examples of adhesives suitable for use in wellbore tools may include, but are not limited to, epoxy adhesives, ceramic adhesives, silicone adhesives, cyanoacrylate adhesives, and the like, and any combination thereof. Further, in some instances the mating surface may be treated so as to enhance adhesion. For example, a sand blasting treatment may produce a rougher mating surface for better adhesion.

Substrates suitable for use in growing carbon nanoforest may include, but are not limited to, metal oxides (e.g., titania, alumina, silica, sapphire, and the like), substrates having metal oxide surfaces, glass, and the like. Substrates that are adhered to the mating surface may preferably be thin (e.g., about 5 microns to about 250 microns). As carbon nanoforests are robust to compression, adhesive coupling of a substrate may be facilitated by moderate pressure to mitigate uneven application. Similarly, when the carbon nanoforests are adhesively coupled to the mating surface, moderate pressure may be used to facilitate adequate contact of the carbon nanoforest with the adhesive.

Nanoparticle catalysts suitable for carbon nanostructure growth may include metals, metal oxides, metal sulfides, and the like that comprise iron, nickel, copper, cobalt, chromium, and the like, and any combination thereof. Further, the nanoparticle catalysts may comprise one of the foregoing in combination with a metal or metal oxide that may not play a predominate catalytic role in the carbon nanostructure synthesis but rather contribute to a desired nanoparticle catalyst size, which effects diameter of the carbon nanostructure. Examples of such may include metals or metal oxides comprising molybdenum, aluminum, titanium, magnesium, and the like, and any combination thereof).

In some embodiments (relative to adhesive or direct coupling), providing the plurality of densely packed nanoparticle catalysts may involve depositing the nanoparticle catalysts on the mating surface. Depositing may involve spin coating, dip coating, electrodeposition, drying, chemical vapor deposition, and the like of the nanoparticle catalysts onto the surface. The nanoparticle catalysts should be deposited on the surface at a density sufficient to allow for vertical carbon nanostructure growth where (1) adjacent carbon nanostructures at least partially provide support of each other, (2) the carbon nanostructures have a sufficient diameter to support vertical growth, or (3) both, thereby yielding a carbon nanoforest versus carbon nanostructures lying along the surface. A density suitable for producing carbon nanoforests depends on the size of the nanoparticle catalysts and carbon nanostructure growth conditions. For example, when producing carbon nanoforest that include small diameter carbon nanotubes (e.g., SWNTs to MWNTs with up to a few walls), a suitable nanoparticle density may be about one nanoparticle per about 100 $nm^2$ to about 10 $nm^2$, while for larger diameter MWNTs a suitable density may be one nanoparticle per 1,000 $nm^2$ to about 100 $nm^2$.

In some instances, the nanoparticle catalysts suitable for carbon nanostructure growth may be formed on the surface. In some embodiments, providing the plurality of densely packed nanoparticle catalysts may involve depositing a plurality of molecular precursors to the nanoparticle catalysts on the mating surface; and converting the molecular precursors to the nanoparticle catalysts. Converting may involve exposing the molecular precursors to conditions that cause decomposition (and potentially aggregation) into nanoparticles. Examples of such molecular precursors may include, but are not limited to, Keplerate cages (e.g., comprising iron and molybdenum), metal complexes (e.g., oxo-hexacarboxylate-iron trimer complex), ligated metals, polymers having metals chelated thereto (e.g., iron chelated dendrimers), and the like, and any combination thereof.

One of ordinary skill in the art would understand the conditions that cause these molecular precursors to decompose into suitable nanoparticles for carbon nanostructure growth (e.g., reduction via hydrogen exposure at an elevated temperature, oxidation via exposure to water, alcohols, or oxygen at an elevated temperature, and the like, and a combination thereof (typically in separate steps/exposures)). Typically, these decomposition methods may be performed at temperatures of about 150° C. to about 300° C., depending on the concentration of the reducing agent or oxidizing agent and the composition of the molecules being decomposed. In some instances, converting the molecular precursors and exposing the nanoparticle catalysts to carbon nanostructure growth conditions (described in more detail herein) may occur in one heating cycle.

Similar to the description above, the molecular precursors should be at a sufficient concentration on the surface to yield a density of the nanoparticle catalysts to support vertical growth.

In both instances, the deposition of the nanoparticle catalysts or molecular precursors thereof may be deposited on only a portion of the surface of a substrate or first/second element, which may be achieved by masking the portion of the surface that is to be free of the carbon nanoforest. After deposition of the nanoparticle catalysts or molecular precursors thereof, the mask may be removed and the carbon nanoforest grown.

Growing carbon nanoforests may involve exposing the nanoparticle catalysts to carbon nanostructure growth conditions for a time period so as to achieve a carbon nanoforest with a desired height (e.g., a height corresponding to the distance between mating surfaces). The time period of exposure to carbon nanostructure growth conditions may be from a few seconds to several minutes or even hours depending on the carbon nanostructure growth conditions and desired height of the carbon nanoforest. The desired height of the carbon nanoforest may, in some instances correspond to the distance between the mating surface. In other instances, the desired height may be more or less than the distance between the mating surface. For example, if the carbon nanoforest will be under compression, the desired distance is greater than the distance between the mating surfaces. In another example, if corresponding carbon nanoforests on opposing mating surfaces touch (e.g., as illustrated in FIG. 6), the desired distance would be less than the distance between the mating surfaces.

Suitable carbon nanostructure growth conditions generally include elevated temperatures (e.g., about 400° C. to about 1200° C.) and a gaseous carbon source (e.g., methane, ethane, ethylene, acetylene, carbon monoxide, methanol, ethanol, and the like). Further, carbon nanostructure growth conditions may further include a growth promoter (e.g., thiols, water, oxygen, and the like). One of ordinary skill in the art of carbon nanostructure synthesis should recognize appropriate concentrations of growth promoters and combination of growth promoters with the nanoparticle catalysts and gaseous carbon source so as not to stifle growth with the growth promoter.

One of ordinary skill in the art, with the benefit of this disclosure, would recognize that the quality of the carbon nanostructures (e.g., as determined by the amount of defects in the sidewalls) depends on, inter alia, the temperature, the composition of carbon source, the concentration of the carbon source, the composition of the nanoparticle catalysts, the size of the nanoparticle catalysts, the composition of the surface, and the like. For example, synthesis of lower quality carbon nanostructures may be achieved at lower temperatures, whereas high quality carbon nanostructures are typically synthesized at higher temperatures.

One of ordinary skill in the art would recognize the desired quality of the carbon nanostructures in joint applications described herein, which may depend on, inter alia, the placement of the carbon nanostructures, the operational duration of the joint, the temperature of the environment in which the joint is being operated, other components in the fluid in which the joint is being operated, and the compositions and size of the abrasive particles. For example, when abrasive particles of small diameter (e.g., about 150 nm or less) are of concern, the higher quality carbon nanostructures may be more appropriate as they may be more resilient to abrasive wear and have higher filtration efficacy. While in other applications where microparticles and larger nanoparticles (e.g., about 150 nm or greater) are of concern, lower quality carbon nanostructures may be appropriate. Further, high quality carbon nanostructures may be preferred when the joint is exposed to fluids that could chemically degrade the carbon nanostructures (e.g., acidic environments) because the more pristine sidewalls of the higher quality carbon nanostructure are more chemical resistant.

Additionally, the surface on which the carbon nanoforest is grown may impact the carbon nanostructure growth conditions, and consequently, the quality of the carbon nanostructures. For example, when growing directly on a mating surface, one of ordinary skill in the art would recognize that the carbon nanostructure growth conditions should be chosen so as not to negatively impact the element corresponding to the mating surface. For example, a high-temperature, carbon-rich environment may cause some materials (or chemical components thereof) to absorb carbon, react to form a carbide, or the like, so as to yield a more brittle material that is no longer suitable for use in joints.

Embodiments disclosed herein include:

A. a wellbore tool that includes a joint comprising two elements having opposing mating surfaces that define a gap; a compressible sealing element arranged between the opposing mating surfaces and configured to seal a portion of the gap, thereby defining a sealed segment and an unsealed segment of the gap; and at least one carbon nanoforest disposed within at least a portion of the unsealed segment and coupled to at least one of the opposing mating surfaces; and B. a wellbore tool that includes a joint comprising two elements having opposing mating surfaces that define a gap; a compressible sealing element arranged between the two elements and configured to seal a portion of the gap, thereby defining a sealed segment and an unsealed segment of the gap; and a carbon nanoforest within at least a portion of the unsealed segment and coupled at least one of the opposing mating surfaces, wherein the carbon nanoforest extends into a groove configured to receive the compressible sealing element, and wherein the carbon nanotube forest comprises a plurality of multi-walled carbon nanotube.

Each of embodiments A and B may have one or more of the following additional elements in any combination, unless already provided for: Element 1: the at least one carbon nanoforest being adhesively coupled to the mating surface of the first element; Element 2: the at least one carbon nanoforest being directly coupled to the mating surface of the first element; Element 3: the at least one carbon nanoforest comprising a first carbon nanoforest adhesively coupled to one of the opposing mating surfaces and a second carbon nanoforest directly coupled to one of the opposing mating surfaces; Element 4: the at least one carbon nanoforest comprising a first carbon nanoforest coupled to the mating surface of the first element and a second carbon nanoforest coupled to the mating surface of the second element; Element 5: the first and second carbon nanoforests of Element 4 being arranged in series within the unsealed segment; Element 6: the first and second carbon nanoforests of Element 4 being in at least partial physical contact with each other; Element 7: the at least one carbon nanoforest extending into a groove configured to receive the compressible sealing element; Element 8: the at least one carbon nanoforest extending beyond the gap along an extended surface corresponding to the first or second mating surfaces to which the carbon nanoforest is coupled; Element 9: the at least one carbon nanoforest comprising a plurality of single-walled carbon nanotubes; Element 10: the at least one carbon nanoforest being under compression; and Element 11: the wellbore tool being a roller cone drill bit, a sliding sleeve, a reamer, or a pump.

By way of non-limiting example, exemplary combinations applicable to A and B include: Element 1, 2, or 3 in combination with Element 4; the foregoing in combination with Element 5 or Element 6; at least one of Elements 7-11 in combination with any of the foregoing; and so on.

Embodiments disclosed herein also include:

C. a method that includes providing a plurality of densely packed nanoparticle catalysts on a mating surface of an element of a joint; and exposing the nanoparticle catalysts to carbon nanostructure growth conditions for a time period so as to achieve a carbon nanoforest with a desired height;

D. a method that includes providing a plurality of densely packed nanoparticle catalysts on a substrate; exposing the nanoparticle catalysts to carbon nanostructure growth conditions for a time period so as to achieve a carbon nanoforest with a desired height; and adhering the substrate to a portion of a mating surface of an element of a joint; and E. a method that includes providing a plurality of densely packed nanoparticle catalysts on a substrate; exposing the nanoparticle catalysts to carbon nanostructure growth conditions for a time period so as to achieve a carbon nanoforest with a desired height; adhering the carbon nanoforest to a portion of a mating surface of an element of a joint; and separating the carbon nanoforest from the substrate.

Each of embodiments C, D, and E may have one or more of the following additional elements in any combination, unless already provided for: Element 12: the element being a portion of a wellbore tool and the method further including assembling the wellbore tool; Element 13: wherein providing the plurality of densely packed nanoparticle catalysts involves depositing the nanoparticle catalysts on the mating surface or the substrate; and Element 14: wherein providing the plurality of densely packed nanoparticle catalysts involves depositing a plurality of molecular precursors to the nanoparticle catalysts on the mating surface or the substrate; and converting the molecular precursors to the nanoparticle catalysts.

By way of non-limiting example, exemplary combinations applicable to C, D, and E include: Element 12 in combination with one of Elements 13 or 14; at least one of Elements 7, 8, or 9 in combination with any of the foregoing; element 11 in combination with any of the foregoing; and so on.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention disclosed herein are presented below. Not all features of an actual implementation are described or shown in this application for the sake of clarity. It is understood that in the development of an actual embodiment incorporating the present invention, numerous implementation-specific decisions must be made to achieve the developer's goals, such as compliance with system-related, business-related, government-related and other constraints, which vary by implementation and from time to time. While a developer's efforts might be complex and time-consuming, such efforts would be, nevertheless, a routine undertaking for those of ordinary skill in the art having benefit of this disclosure.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A wellbore tool comprising:
a joint comprising two elements having opposing mating surfaces that define a gap;
a compressible sealing element arranged between the opposing mating surfaces and configured to seal a portion of the gap, thereby defining a sealed segment and an unsealed segment of the gap; and
first and second carbon nanoforests disposed within at least a portion of the unsealed segment and coupled to the opposing mating surfaces,
wherein the first carbon nanoforest is coupled to the mating surface of the first element and the second carbon nanoforest is coupled to the mating surface of the second element,
wherein the first and second carbon nanoforests extend radially toward each other and a portion of distal ends of the first carbon nanoforest is in physical contact with a portion of distal ends of the second carbon nanoforest,
wherein the first and second carbon nanoforests are wearable and respond to abrasion to produce graphene that lubricates the joint, and
wherein the first and second carbon nanoforests each comprise a plurality of carbon nanotubes, and the first and second carbon nanoforests each have a density within a range from one of the carbon nanotubes per about 10 $nm^2$ to one of the carbon nanotubes per about 1000 $nm^2$.

2. The wellbore tool of claim 1, wherein the first carbon nanoforest is adhesively coupled to the mating surface of the first element.

3. The wellbore tool of claim 1, wherein the first carbon nanoforest is directly coupled to the mating surface of the first element.

4. The wellbore tool of claim 1, wherein the first and second carbon nanoforests are arranged in series within the unsealed segment.

5. The wellbore tool of claim 1, wherein the first and second carbon nanoforests extend into a groove configured to receive the compressible sealing element.

6. The wellbore tool of claim 1, wherein at least one of the first and second carbon nanoforests extends beyond the gap along an extended surface corresponding to the first or second mating surfaces to which the carbon nanoforest is coupled.

7. The wellbore tool of claim 1, wherein at least one of the first and second carbon nanoforests comprises a plurality of single-walled carbon nanotubes.

8. The wellbore tool of claim 1, wherein at least one of the first and second carbon nanoforests is under compression.

9. The wellbore tool of claim 1, wherein the wellbore tool is a roller cone drill bit, a sliding sleeve, a reamer, or a pump.

10. A wellbore tool comprising:
a joint comprising two elements having opposing mating surfaces that define a gap;
a compressible sealing element arranged between the two elements and configured to seal a portion of the gap, thereby defining a sealed segment and an unsealed segment of the gap; and
first and second carbon nanoforests within at least a portion of the unsealed segment and coupled to at least one of the opposing mating surfaces, wherein the first and second carbon nanoforests extend into a groove configured to receive the compressible sealing element, and wherein at least one of the first and second carbon nanoforests comprises a plurality of multi-walled carbon nanotubes,
wherein the first carbon nanoforest is coupled to the mating surface of the first element and the second carbon nanoforest is coupled to the mating surface of the second element,
wherein the first and second carbon nanoforests extend radially toward each other and a portion of distal ends of the first carbon nanoforest is in physical contact with a portion of distal ends of the second carbon nanoforest,
wherein the first and second carbon nanoforests are wearable and respond to abrasion to produce graphene that lubricates the joint, and
wherein the first and second carbon nanoforests each comprise a plurality of carbon nanotubes, and the first and second carbon nanoforests each have a density within a range from one of the carbon nanotubes per about 10 $nm^2$ to one of the carbon nanotubes per about 1000 $nm^2$.

11. The wellbore tool of claim 10, wherein the first carbon nanoforest is adhesively coupled to the mating surface of the first element.

12. The wellbore tool of claim 10, wherein the first carbon nanoforest is directly coupled to the mating surface of the first element.

13. The wellbore tool of claim 10, wherein at least one of the first and second carbon nanoforests further comprises a plurality of single-walled carbon nanotubes.

14. The wellbore tool of claim 10, wherein at least one of the first and second carbon nanoforests is under compression.

15. The wellbore tool of claim 10, wherein the wellbore tool is a roller cone drill bit, a sliding sleeve, a reamer, or a pump.

16. A method comprising:
providing a plurality of densely packed nanoparticle catalysts on a mating surface of an element of a joint; and
exposing the nanoparticle catalysts to carbon nanostructure growth conditions for a time period so as to achieve a carbon nanoforest with a desired height,
wherein the carbon nanoforest comprises a first carbon nanoforest coupled to the mating surface of a first element of the joint and a second carbon nanoforest coupled to the mating surface of a second element of the joint,
wherein the first and second carbon nanoforests extend radially toward each other and a portion of distal ends of the first carbon nanoforest is in physical contact with a portion of distal ends of the second carbon nanoforest,
wherein the first and second carbon nanoforests are wearable and respond to abrasion to produce graphene that lubricates the joint, and
wherein the first and second carbon nanoforests each comprise a plurality of carbon nanotubes, and the first and second carbon nanoforests each have a density within a range from one of the carbon nanotubes per about 10 $nm^2$ to one of the carbon nanotubes per about 1000 $nm^2$.

17. The method of claim 16, wherein the element is a portion of a wellbore tool and the method further comprises assembling the wellbore tool.

18. The method of claim 16, wherein providing the plurality of densely packed nanoparticle catalysts involves depositing the nanoparticle catalysts on the mating surface.

19. The method of claim 16, wherein providing the plurality of densely packed nanoparticle catalysts involves depositing a plurality of molecular precursors to the nanoparticle catalysts on the mating surface; and converting the molecular precursors to the nanoparticle catalysts.

20. A method comprising:
providing a plurality of densely packed nanoparticle catalysts on a substrate;
exposing the nanoparticle catalysts to carbon nanostructure growth conditions for a time period so as to achieve a carbon nanoforest with a desired height; and
adhering the substrate to a portion of a mating surface of an element of a joint,
wherein the carbon nanoforest comprises a first carbon nanoforest coupled to the mating surface of a first element of the joint and a second carbon nanoforest coupled to the mating surface of a second element of the joint,
wherein the first and second carbon nanoforests extend radially toward each other and a portion of distal ends of the first carbon nanoforest is in physical contact with a portion of distal ends of the second carbon nanoforest,
wherein the first and second carbon nanoforests are wearable and respond to abrasion to produce graphene that lubricates the joint, and
wherein the first and second carbon nanoforests each comprise a plurality of carbon nanotubes, and the first and second carbon nanoforests each have a density within a range from one of the carbon nanotubes per about 10 $nm^2$ to one of the carbon nanotubes per about 1000 $nm^2$.

21. The method of claim 20, wherein the element is a portion of a wellbore tool and the method further comprises assembling the wellbore tool.

22. A method comprising:
providing a plurality of densely packed nanoparticle catalysts on a substrate;
exposing the nanoparticle catalysts to carbon nanostructure growth conditions for a time period so as to achieve a carbon nanoforest with a desired height;
adhering the carbon nanoforest to a portion of a mating surface of an element of a joint; and
separating the carbon nanoforest from the substrate,
wherein the carbon nanoforest comprises a first carbon nanoforest coupled to the mating surface of a first element of the joint and a second carbon nanoforest coupled to the mating surface of a second element of the joint,
wherein the first and second carbon nanoforests extend radially toward each other and a portion of distal ends of the first carbon nanoforest is in physical contact with a portion of distal ends of the second carbon nanoforest,
wherein the first and second carbon nanoforests are wearable and respond to abrasion to produce graphene that lubricates the joint, and
wherein the first and second carbon nanoforests each comprise a plurality of carbon nanotubes, and the first and second carbon nanoforests each have a density within a range from one of the carbon nanotubes per about 10 $nm^2$ to one of the carbon nanotubes per about 1000 $nm^2$.

23. The method of claim 22, wherein the element is a portion of a wellbore tool and the method further comprises assembling the wellbore tool.

* * * * *